United States Patent [19]
Lopez

[11] Patent Number: 5,474,102
[45] Date of Patent: Dec. 12, 1995

US005474102A

[54] FLUID DISTRIBUTION MANIFOLD

[76] Inventor: Robert Lopez, 2060 E. Locust, #D, Ontario, Calif., 91761

[21] Appl. No.: 195,253

[22] Filed: Feb. 14, 1994

Related U.S. Application Data

[63] Continuation-in-part of Ser. No. 729,634, Jul. 15, 1991, abandoned.

[51] Int. Cl.$^6$ ..................... A61H 33/02
[52] U.S. Cl. ............... 137/271; 137/561 A; 4/541.5
[58] Field of Search .................. 137/271, 561 R, 137/561 A; 128/365, 369, 370; 4/541.4, 541.5

[56] References Cited

U.S. PATENT DOCUMENTS

| | | | |
|---|---|---|---|
| 2,956,565 | 10/1960 | Anderson | 128/369 |
| 4,237,562 | 12/1980 | DuPont | 4/543 |
| 4,672,692 | 6/1987 | Savage | 4/453 |
| 4,712,578 | 12/1987 | White | 137/561 A |
| 4,782,852 | 11/1988 | Legris | 137/271 X |
| 4,800,921 | 1/1989 | Greebe | 137/561 A |
| 4,901,379 | 2/1990 | Chalberg et al. | 4/543 |

*Primary Examiner*—John Rivell
*Attorney, Agent, or Firm*—Robert N. Schlesinger

[57] ABSTRACT

This invention relates to a fluid distribution manifold, where the input piping is inserted in through the manifold's circular intake opening and onto its cylindrical input port. The manifold's intake opening leads through a cylindrical path to a closed terminal end. Along the inner manifold wall, there are arranged in a sequence, which may be in a straight line, a series of straight lines or rows, a spiral, or an alternating 90- or 180-degree arrangement, a number of distribution outlet openings and their respective ports, which may be barbed or ribbed on their outer surface. The manifold has the further utility of being expandable to larger sizes. This is achieved by removing the closed terminal end from one manifold and then inserting and connecting that open terminal end in through another manifold's circular intake opening and into its intake port. To achieve a more uniform fluid flow pressure at each of the distribution outlet ports, two or more manifold devices may be fitted and connected to intake piping which is fitted with a T-joint or Y-joint. In a preferred embodiment, the manifold is composed of acrylonitrile-butadiene-styrene, and is used to distribute air in spas and hydrotherapy baths.

23 Claims, 18 Drawing Sheets

FLUID DISTRIBUTION MANIFOLD

This is application is a Continuation-in-Part Application of application Ser. No. 07/729,634, filed Jul. 15, 1991, now abandoned.

BACKGROUND

Field of the Invention

This invention was devised and invented by Robert Lopez, and relates to a manifold device with a circular intake opening where the input plumbing or piping is inserted in through the circular opening and into the cylindrical input section or port of the manifold. The intake opening leads through a cylindrical path to a closed terminal end. Along the cylindrical surface, i.e., the manifold wall, there are arranged in a sequence, a plurality of distribution openings and their respective barbed or ribbed outlet ports, which may be used for the forced distribution of fluid from the intake port. This sequence of ports may be in a straight line arrangement or in a spiral or, e.g.,an alternating 90-degree or 180-degree arrangement.

DESCRIPTION OF THE PRIOR ART AND NEED FOR THE PRESENT INVENTION

A primary application of this invention is to distribute the air used in certain air injectors and water jets in spas and hydrotherapy baths. The air which enters the intake port via the air flow piping or plumbing, may be forced air from a pump or it may be sucked or siphoned in through a Venturi process (i.e., being "Venturied" through). Throughout this specification and the appended claims, the word "forced" may be interpreted as fluid (e.g., air) pumped via a motor, or as air being sucked or siphoned though the manifold and the piping or plumbing, via the Venturi process. Once the air enters the intake port, it is distributed through the manifold's distribution openings and out through their respective outlet ports, which may be barbed or ribbed. The plumbing or piping from these outlet ports generally leads to an air injector or a water jet in the spa or hydrotherapy bath.

The forced air used heretofore in spas and hydrotherapy baths is pumped to the various air injectors and water jets in-line and in-series. This traditional plumbing of the spa or hydrotherapy bath's injectors and jets in-line through one main pipe making a circuit around the spa or bath to each of the jets in-series, causes a significant variance between the air pressure emanating from, e.g., the first injector or jet in the series and the last injector or jet in the series. This variance in air pressure is mechanically troublesome because it may cause premature breakdown of the first air injectors or water jets in the circuit or plumbing, functioning under the greatest pressure. This variance in air pressure is also mechanically troublesome because a problem in the plumbing line or in an air injector or water jet may cause a functional breakdown in other injectors or jets further down-line. For example, a line blockage may cause breakdown in the function of the air injectors or water jets down-line, or a fully open air injector or water jet may reduce the air pressure at the injector or jet sites down-line to an essentially nonfunctioning state. Variance in air pressure at the air injector or water jet sites is also a distraction and may be an annoyance to the persons using the spa or hydrotherapy bath.

The in-line and in-series plumbing of air to the various injectors and jets in a spa is done through the use of Y- or T-joints in the plumbing, such that for each air injector or water jet, there must be a Y- or T-joint from the air plumbing line or circuit to supply the jet. These Y- or T-joints are secured to the plumbing line and the injector or jet with glue, and each injector or jet and its Y- or T-joint thereby has several glued fittings.

DESCRIPTION OF THE PRESENT INVENTION

In trying to solve these spa industry disadvantages and problems, and within the scope of this objective, it was surprising to find that a solution to the above described disadvantages and problems need not be expensive or highly difficult to install or maintain.

The objectives and advantages of a simple embodiment the present invention are:

1) The air pressure at the various air injector and water jet sites would be more uniform and have less variability, thereby making the present manifold invention superior to existing systems.

2) This multiport air distribution manifold may be fitted with the various plumbing lines (i.e., a plumbing harness) prior to the actual spa assembly process. As elaborated below, this plumbing harness may be fitted, sealed, or glued and cured, and pre-assembled and pressure-checked, prior to actual spa assembly. This also affords the glue whatever time is necessary to cure, and further improves the efficiency of the manufacturing process.

3) This multiport air distribution manifold with the fitted plumbing lines (i.e., plumbing harness) may be pressure checked prior to the actual spa assembly process.

4) There would be a significant reduction or in some embodiments an elimination of the gluing process in this aspect of spa assembly, thereby also eliminating the glue drying time (i.e., curing time) in the spa assembly process.

5) Manufacturing assembly of the air plumbing lines in spas would be easier, quicker, and more efficient, and this increased efficiency would lead to a significant cost reduction.

6) This multiport air distribution manifold and its plumbing system could be used with a corresponding multiport water distribution manifold, to feed air and water to the water jets in spas and hydrotherapy baths.

7) This multiport air distribution manifold affords the spa designer the option of affixing control mechanisms to the independent air plumbing lines leading to each air injector and water jet, which may vary the flow rate or cause the flow rate to pulsate, thereby causing a pulsative flow in selected jets, which may be desirable in, e.g., hydrotherapy spas and baths.

8) This multiport air distribution system may be manufactured in an embodiment to have ten outlet ports, as shown in FIGS. 1 through 3, described below.

9) If, however, the spa designer desired fourteen injectors or jets requiring air, a ten port manifold may be cut open on the closed end and another ten port manifold may be cut near the closed end, but prior to the location of the final four outlet ports. These two modified manifolds may then be attached through the use of glue, as shown in FIGS. 6 and 7 and as described below, or these manifolds may be attached through the use of some other type of fastening means, such as a hose clamp or a sealant material or fabric, with a hose clamp fastening the two adapted manifolds together in a sealed manner.

10) These two or more manifolds as described above in item 9, may also be attached through the use of a threaded manifold, wherein the interior of the intake port of the manifold is threaded, and another manifold with a matably threaded end of the cylindrical path between the removed, closed terminal end and its closest outlet port, as shown in FIG. 12, as described below.

11) Another multiport air distribution system may be designed by attaching one or more of the present fluid distribution manifolds to each end of the bifurcated ends a Y-joint, as shown in FIGS. 4 through 7, as described below.

12) The arrangement of output ports in the present invention may be in a linear arrangement, as described above, or in a spiral arrangement, as shown in FIG. 8 and as described below, or wherein the spiraling output ports may be in, e.g., 90-degree increments around the cylindrical body of the manifold body, as shown in FIG. 9, as described below.

13) The arrangement of output ports in the present invention may be in a linear arrangement, as described above, or in a 180-degree arrangement, wherein the output ports are arranged in an alternating arrangement of approximately 180-degree increments along the cylindrical path of the manifold, as shown in FIG. 10, as described below.

14) The arrangement of output ports in the present invention may be in the 180-degree arrangement, as described above in item 13, or the output ports may be arranged in an approximately 180-degree arrangement, in increments along along the cylindrical path of the manifold, wherein the first plurality of output ports are in-line and a second plurality of output ports are in-line and on the opposite side of the cylindrical path of the manifold, and as shown in FIG. 11, as described below.

15) The arrangement of output ports in the present invention may be arranged in approximately parallel rows along one side of the cylindrical body of the manifold, as shown in FIG. 15, as described below.

16) The arrangement of output ports in the present invention may be arranged with three rows of output ports, each row being generally 90-degrees around the cylindrical path from its closest neighboring row of output ports, as shown in FIG. 14, as described below.

17) The arrangement of output ports in the present invention may be arranged with four rows of output ports, each row being generally 90-degrees around the cylindrical path from its neighboring row of output ports, as shown in FIG. 13, as described below. This embodiment is to be distinguished from the spiraling embodiment described above in item 12.

18) The arrangement of output ports in the present invention may be arranged with two sets of generally parallel rows of output ports, and each set of parallel rows is generally 180-degrees opposite each other along the cylindrical path of the manifold body, as shown in FIG. 16, as described below.

19) The arrangement of output ports in the present invention may be arranged with three sets of generally parallel rows of output ports, along the cylindrical path of the manifold body, as shown in FIG. 17., described below. This embodiment is somewhat similar to the embodiment described above in item 16.

20) The arrangement of output ports in the present invention may be arranged with four sets of generally parallel rows of output ports, and each set of parallel rows is generally 90-degrees around the cylindrical path of the manifold body, from its neighboring row of output ports, as shown in FIG. 18, as described below.

Further objects, features, and advantages of the present invention will become more apparent from the following description when taken with the accompanying drawings which show, for purposes of illustration only, an embodiment construction in accordance with the present invention.

DRAWING FIGURES

The drawings reflect the best embodiments of the Fluid Distribution Manifold, as is intended for use in spas and hydrotherapy baths, but is not limited to such use.

Figure 11:
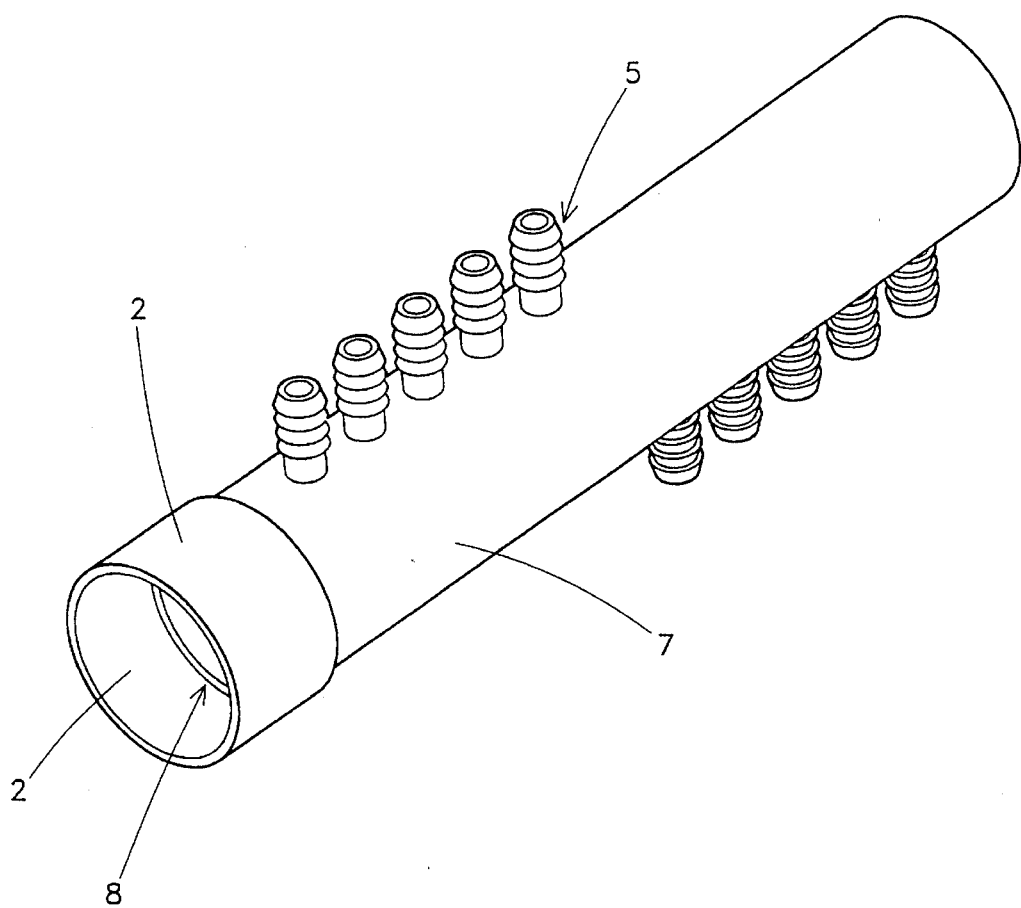

FIG. 11 shows an isometric front view of a manifold wherein the array or sequence of distribution output ports are arranged in an approximately 180-degree arrangement, in increments along the cylindrical path of the manifold wherein the first plurality of output ports are in-line and a second plurality of output ports are in-line and are located approximately 180-degrees about the cylindrical path of the manifold body from the first plurality of ports, i.e., the second plurality of ports are on the opposite side of the cylindrical path of the manifold, as are found the first plurality of ports.

Figure 12:
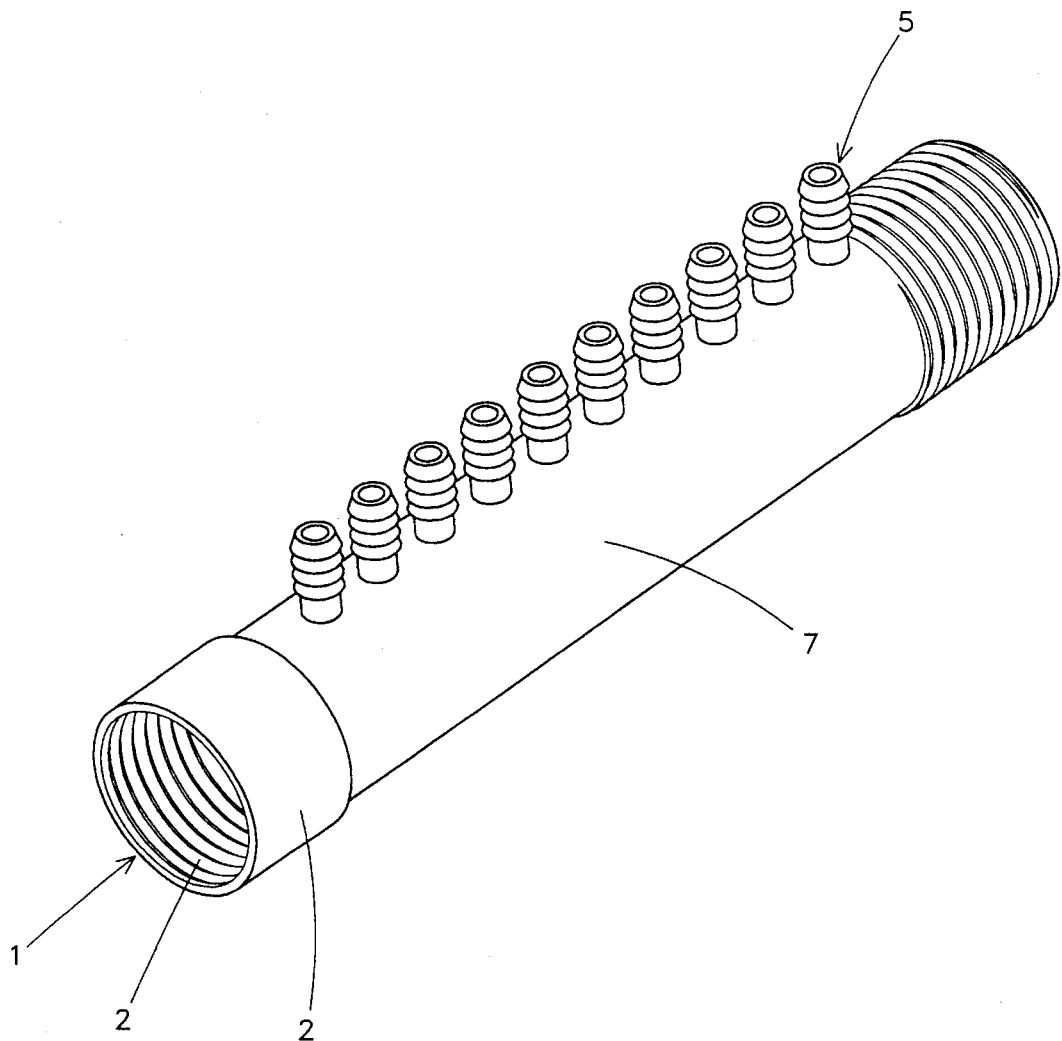

FIG. 12 shows an isometric front view of the manifold with a threaded interior of the intake port, and a matably threaded end of the cylindrical path between the closed terminal end and its closest outlet port.

Figure 13:
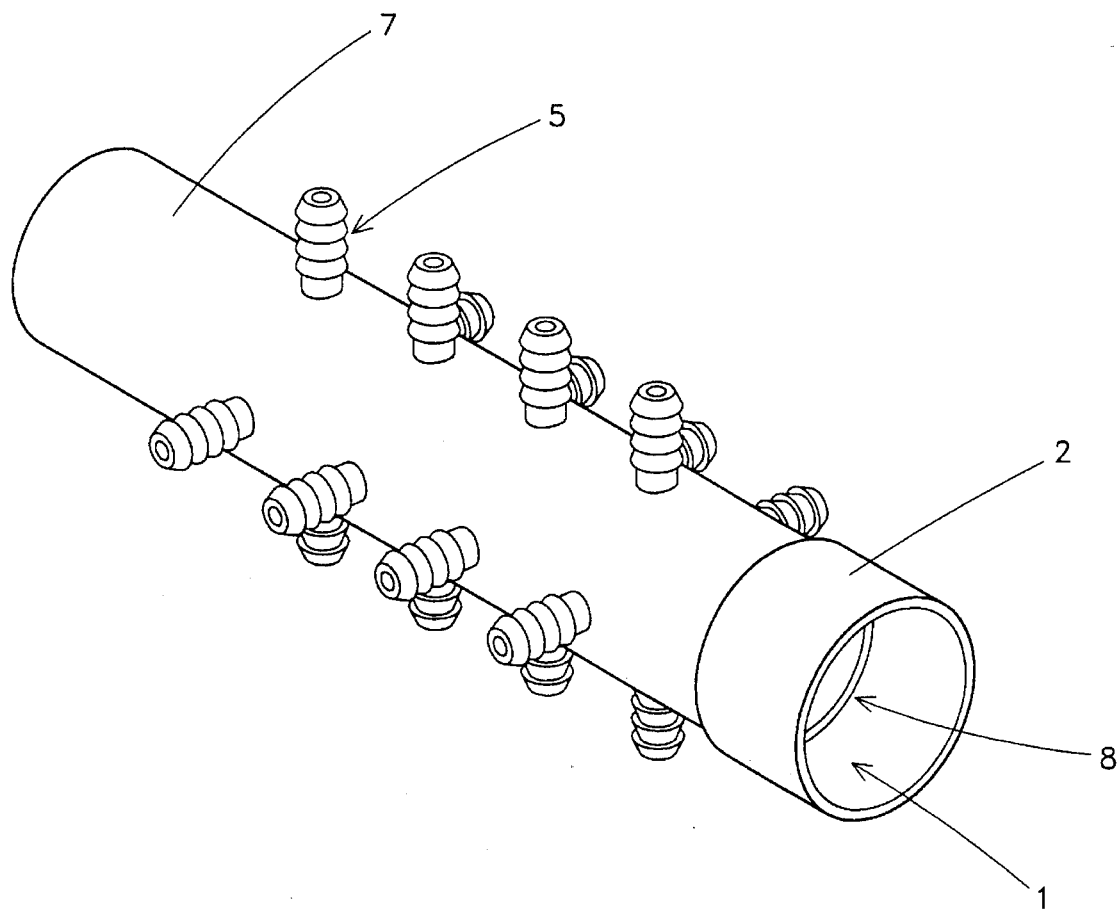

FIG. 13 shows an isometric front view of a manifold with four rows of output ports, along the cylindrical path of the manifold.

Figure 14:
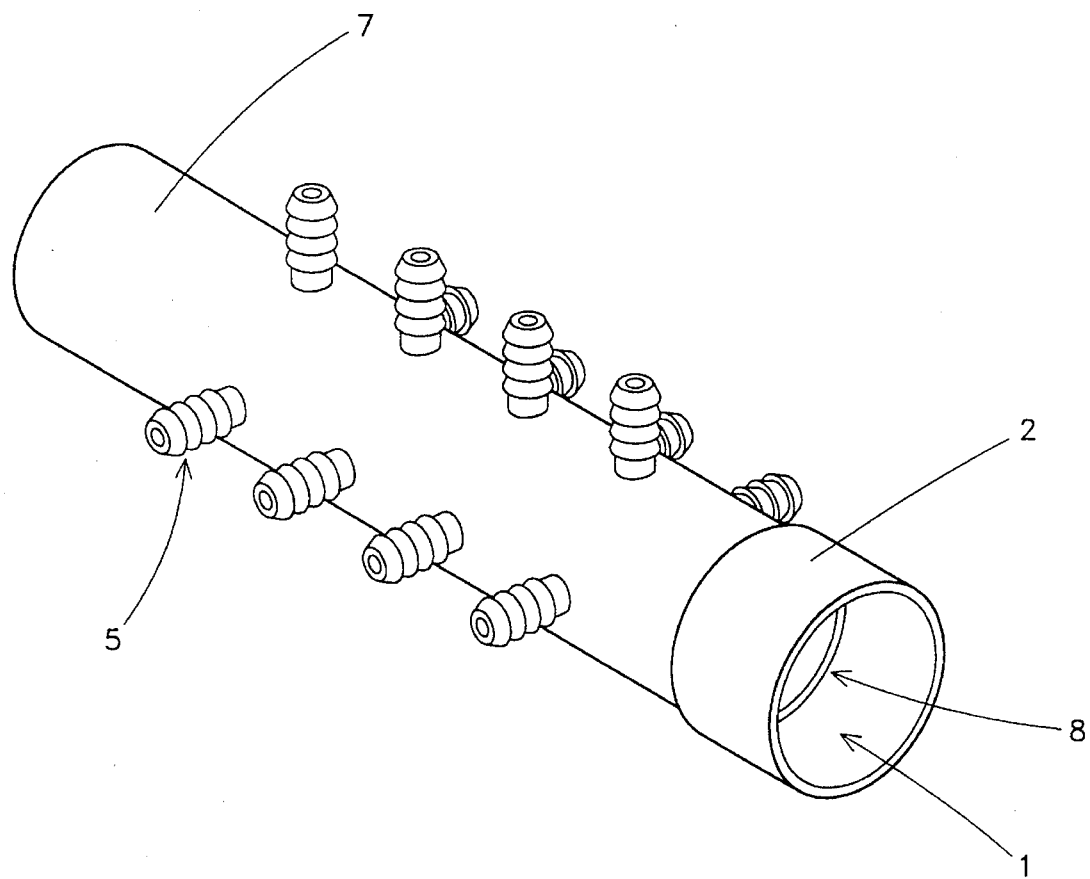

FIG. 14 shows an isometric front view of a manifold with three rows of output ports, each row is generally 90-degrees around the cylindrical path from its closest neighboring row of output ports.

Figure 15:
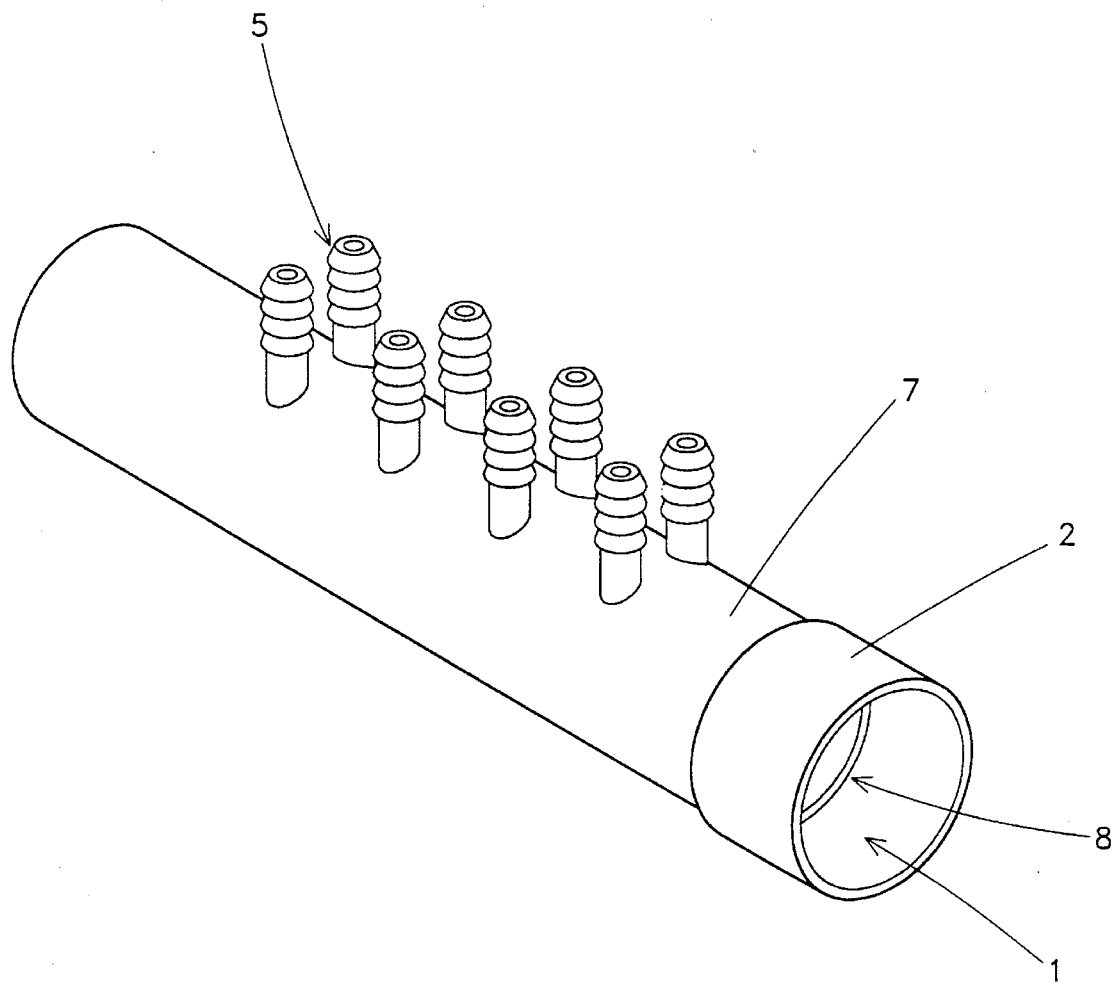

FIG. 15 shows an isometric front view of a manifold with generally parallel rows of output ports.

Figure 16:
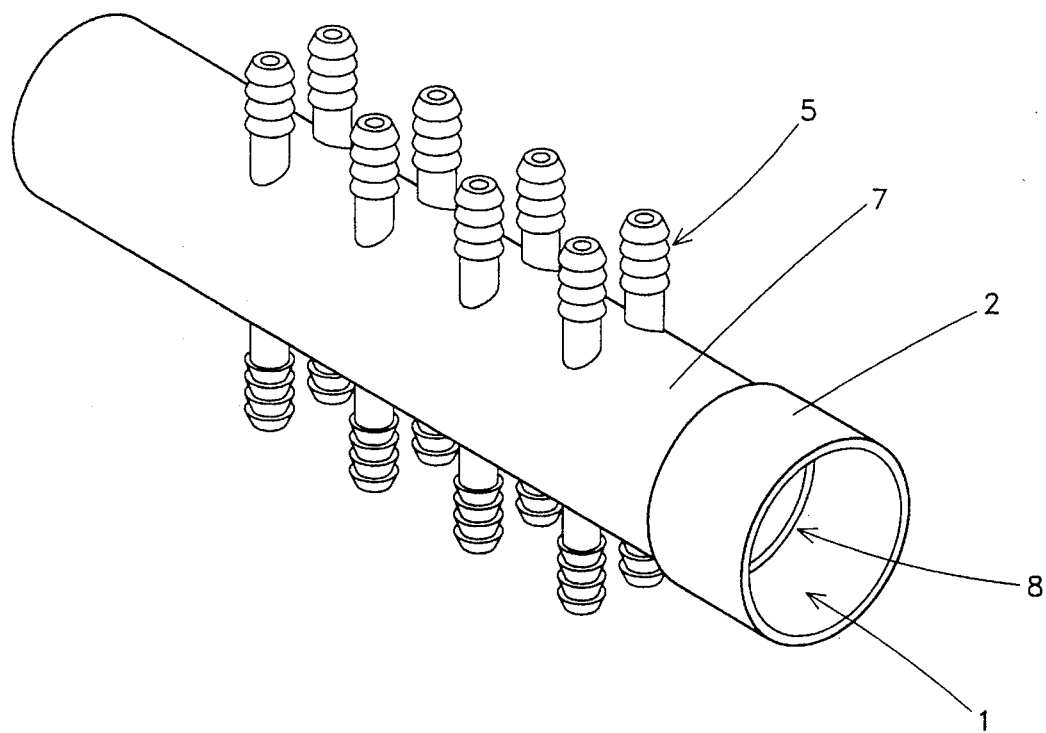

FIG. 16 shows an isometric front view of a manifold with two sets of generally parallel rows of output ports, and each set of parallel rows is generally 180-degrees opposite each other along the cylindrical path of the manifold.

Figure 17:
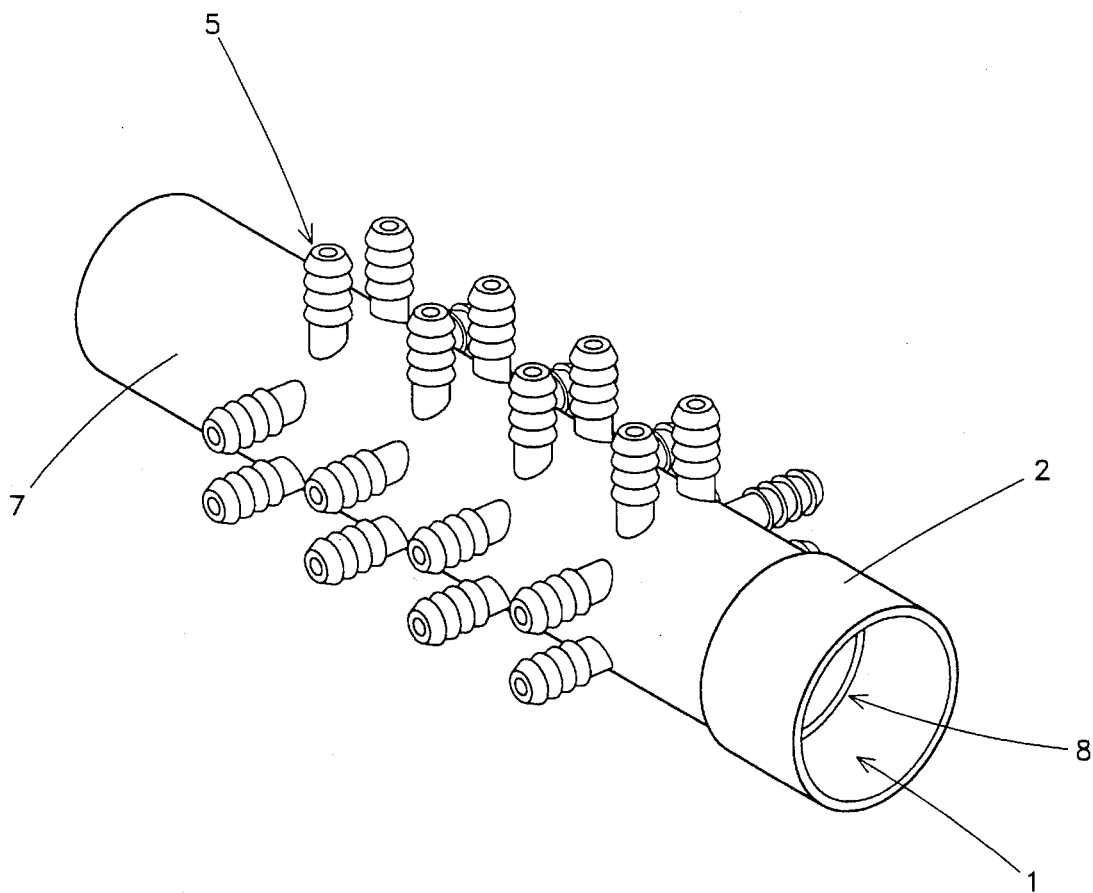

FIG. 17 shows an isometric front view of a manifold with three sets of generally parallel rows of output ports, along the cylindrical path of the manifold.

Figure 18:
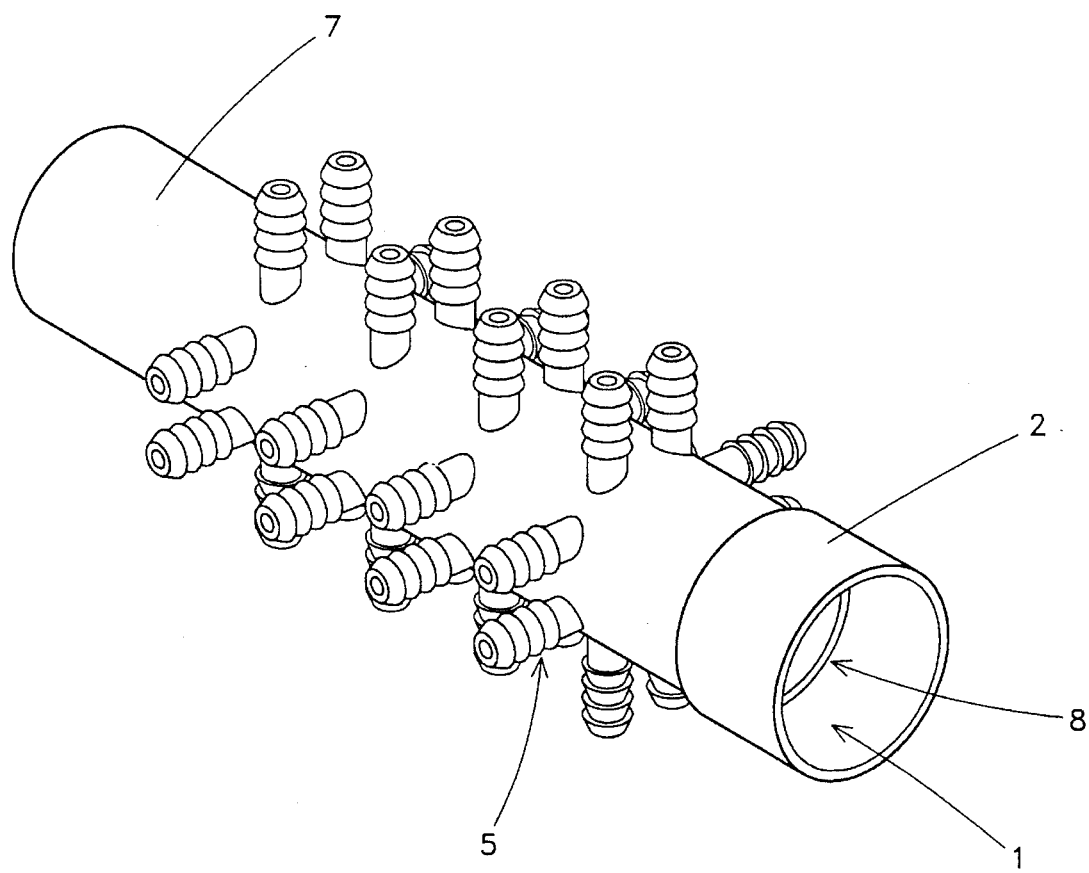

FIG. 18 shows an isometric front view of a manifold with four sets of generally parallel rows of output ports, and each set of parallel rows is generally 90-degrees around the cylindrical path from its neighboring row of output ports.

REFERENCE NUMERALS IN THE DRAWING FIGURES.

Referring now to the drawing figures, like reference numerals are used to refer to like specific parts of the various Figures. The reference numerals used to describe the various parts of the Figures follows.

1. Circular intake opening (1), forming the intake end of the manifold.

2. Intake port (2), which receives the intake plumbing or piping.

3. Manifold wall (3), into which the fluid, such as air, flows prior to forced or Venturied distribution through the output openings (4) and their respective ports (5).

4. Distribution output openings (4), where the fluid, such as air, flows prior to forced or Venturied distribution through the opening (4) and their respective outlet ports (5). The distribution outlet ports (5) as shown in FIGS. 1 through 18, inclusive, show and embodiment with barbed ports (5), other port (5) configurations with more or fewer barbs or with, e.g., one or more ribs as a means of attaching the outlet piping or plumbing are also possible distribution outlet port (5) configurations.

5. Distribution outlet ports (5), where the fluid, such as air, is forced or Venturied through the port (5) to the output plumbing for distribution to their respective jets.

6. Closed terminal end (6) of the manifold.

7. Cylindrical path (7) of the manifold, where the distribution outlet ports (5) are located.

8. Interface ridge (8), between the intake port (2) and the cylindrical path (7) of the manifold, and such ridge's dimensions are a function of the difference between the diameter of the intake port (2) and the cylindrical path (7) of the manifold (e.g., FIG. 1).

DESCRIPTION OF PREFERRED EMBODIMENTS

Referring now to the drawing figures, the reference numerals used to describe the various parts of the invention are shown following mention of the part of the invention in the text herein. Like reference numerals are used to refer to like specific parts in the various Figures.

Figure 1:
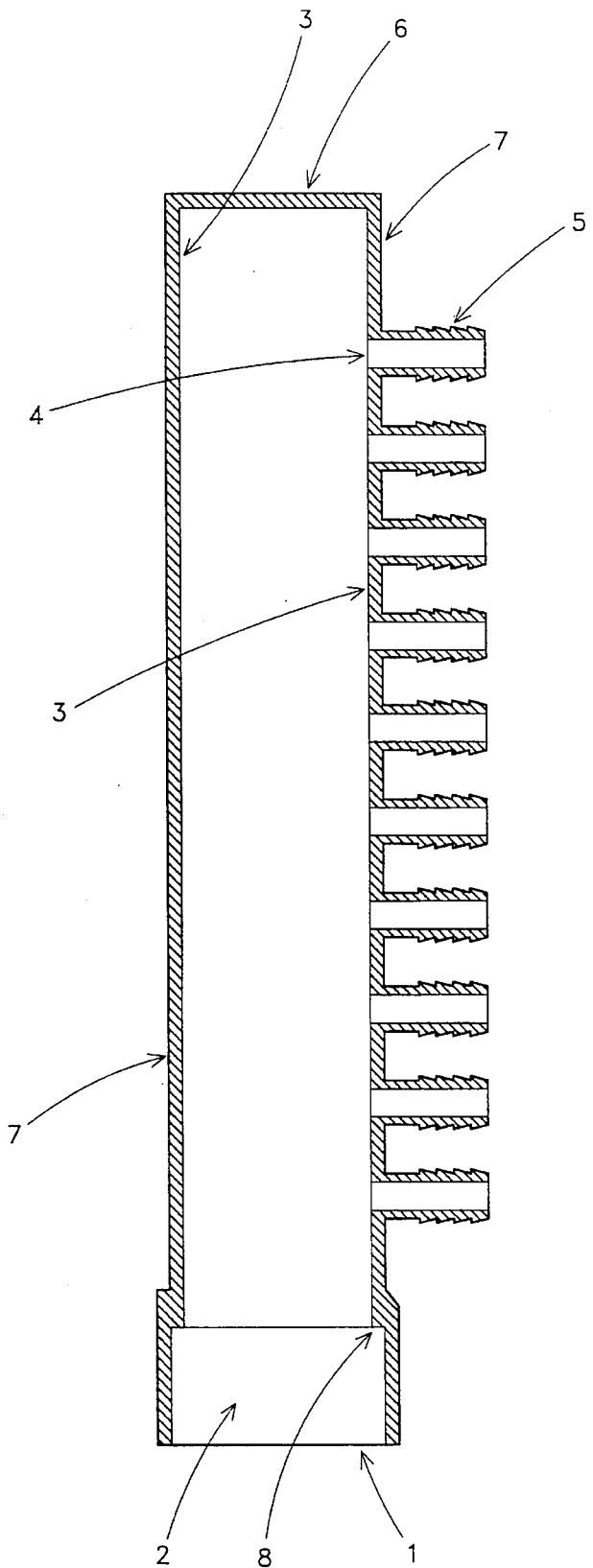
FIG. 1 shows a sectional side view of the fluid distribution output manifold, with ten barbed distribution or output ports.
Figure 2:
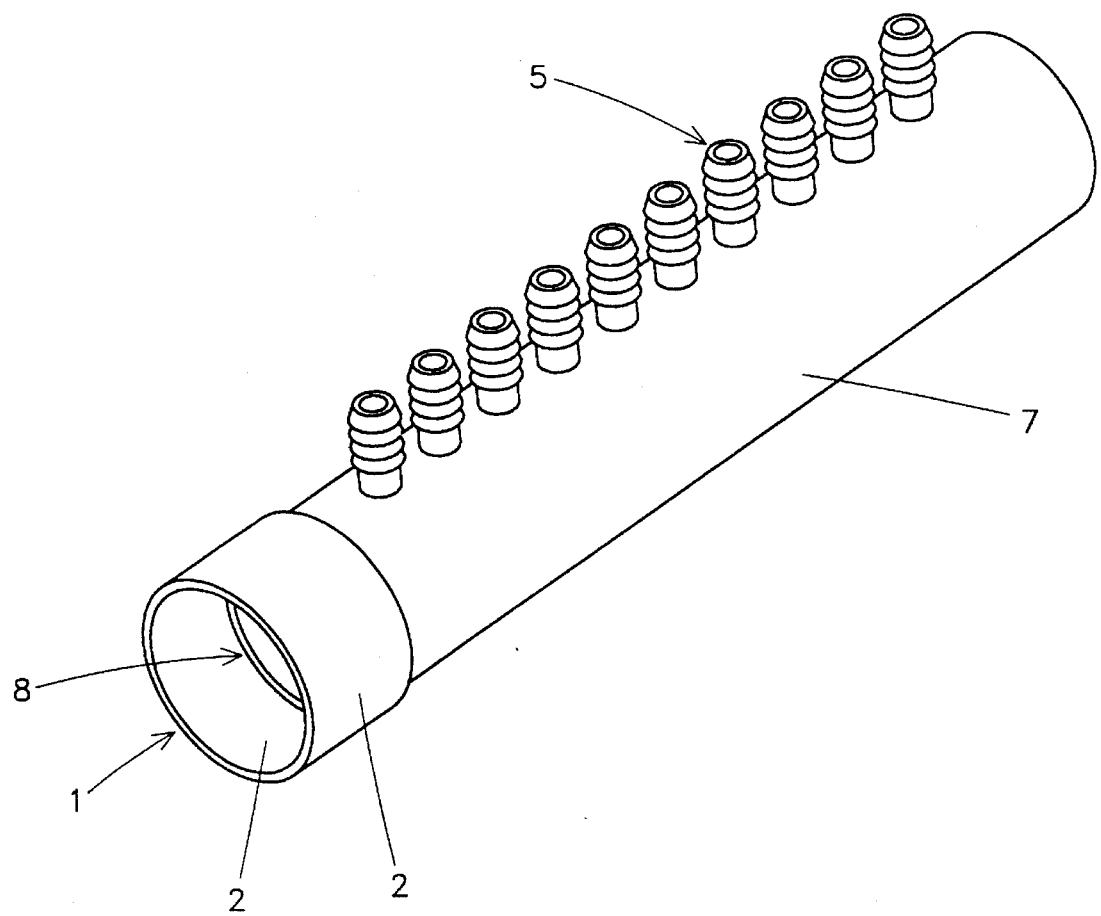
FIG. 2 shows an isometric side view of the manifold, showing a front view of the intake portion of the manifold.
Figure 3:
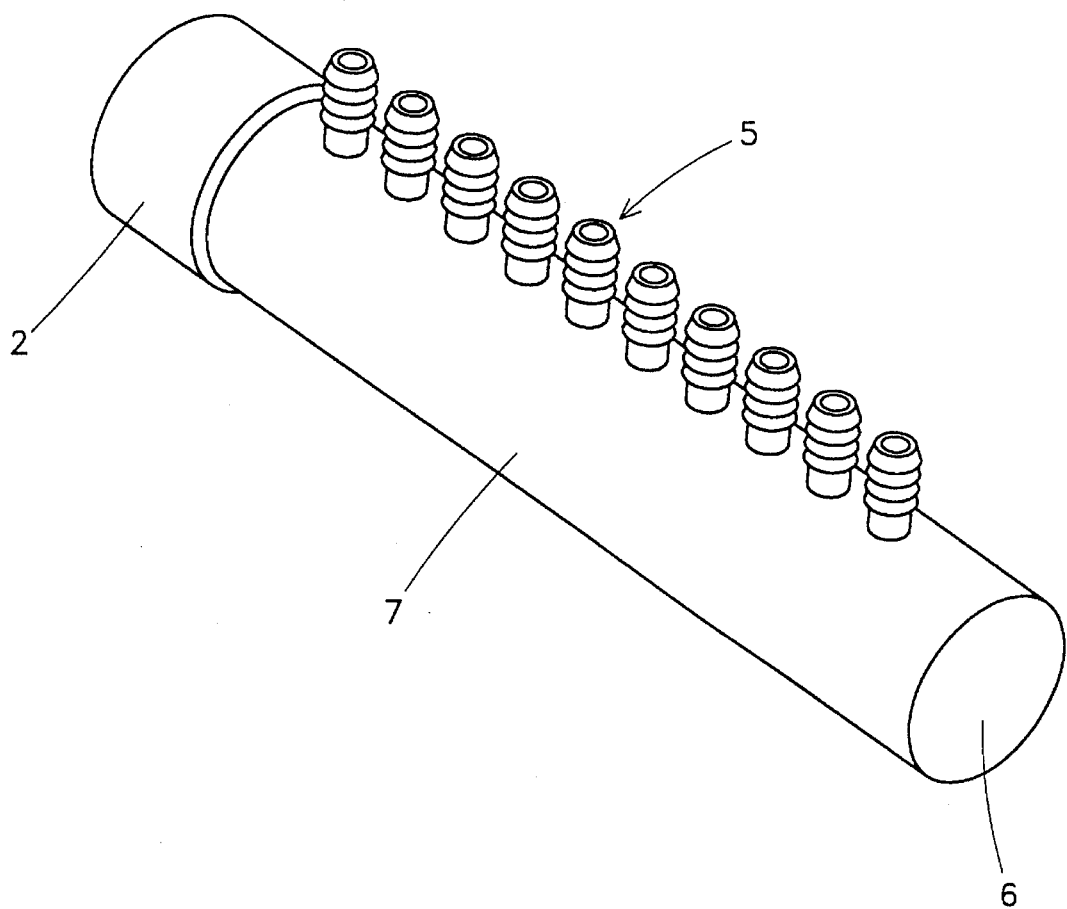
FIG. 3 shows an isometric side view of the manifold, showing a front view of the closed terminal end of the manifold.

In a simple embodiment of the fluid distribution manifold, as shown in FIGS. 1 through 3, inclusive, the manifold is attached to the fluid plumbing or piping at the circular intake opening (1), and the fluid plumbing or piping is inserted into the intake port (2) of the manifold (FIGS. 1 through 3). The fluid plumbing or piping is adhesively attached in a leakproof manner, to the manifold's intake port (2) through the use of a glue, cement, or other bonding material, or through the use of a fastening means. Such fastening means may include, but is not limited to, the use of a threaded piping matedly attached to the intake port (2), which would have the mated threading on the interior of the port (2), so that the piping may be screwed into the port (2), in a leakproof manner. The fluid from the plumbing or piping which is feeding the manifold (FIGS. 1 through 3) through the intake port (2) is then forced through fluid pressure into the manifold (FIGS. 1 through 3). The flow pressure is derived from the Venturi process or through the use of a pump. The manifold (FIGS. 1 through 3) has a closed terminal end (6), opposite to the circular intake opening (1). The fluid entering the manifold (FIGS. 1 through 3) is then forced by the fluid pressure (which may include pressure derived from the Venturi process) through the various fluid distribution outlet openings (4) to their respective distribution outlet ports (5). Attached to the various distribution outlet ports (5) is distribution plumbing or piping, which subdivides and distributes the fluid to varying locations. When the manifold (FIGS. 1 through 3) is used in spas, for the distribution of air, the distribution plumbing terminates at the site of an air injector or a water jet, where the air or a combination of air and water, may be forced or Venturied into the water-filled tub-like portion of the spa.

A preferred embodiment, which may be used in spas, has the following approximate dimensions:

1) Circular intake opening (1) is approximately 2.09 inches in diameter on the outside and is approximately 1.89 inches in diameter on the inside.

2) Intake port (2) is approximately 1.3 inches in length on the outside and approximately 1.1 inches in length.

3) The manifold wall (3) is approximately 0.1 inch in thickness, and the entire manifold device (FIGS. 1 through 3) is approximately 10.637 inches in length.

4) Distribution output openings (4) are each approximately 0.875 inch in length. In a preferred embodiment, each of the outside of the distribution output openings are lined with four barbs for securing polymeric or elastomeric tubing or plumbing to the distribution outlet ports (5).

5) Distribution outlet ports (5) are barbed with four barbs, and each port (5) is approximately 0.4 inch in diameter, with each port opening approximately 0.25 inch in diameter.

6) Closed terminal end (6) of the manifold is approximately 1.892 inches in diameter on the outside and approximately 1.686 inches in diameter on the inside. The diameter of the inside of the closed terminal end (6) is approximately the same diameter as the length of the manifold device (FIGS. 1 through 3).

In this and some other preferred embodiments, the circular intake opening (1) and its port (2) are of a larger diameter than the diameter of the cylindrical path of the manifold (7). This difference in the port (2) diameter and the path (7) diameter, allows the piping or plumbing assembler to quickly and efficiently fit the intake piping into the port (2) and the interface ridge (8) forming this diameter differential thereby allows the assembler to stop the flow piping in place during assembly and thereby prevents the assembler from inserting the piping too far into the manifold (e.g., FIG. 1). This interface ridge (8) also causes an extra seal with the glue or other adhesive material used to bond the intake flow piping or plumbing with the intake port (2) of the manifold (e.g., FIG. 1). In this and some other preferred embodiments, the closed terminal end (6) is of a sufficient distance away from its nearest distribution outlet port (5) (i.e., the final distribution outlet port), to afford the end of the manifold a sufficient section to fit into the circular intake opening (1)

and at least a significant portion of the intake port (2) of a second similar manifold device, if the closed terminal end (6) were removed or cut off, as shown in FIGS. 4 through 7. In this and some other preferred embodiments, such as those used in the spa and hydrotherapy bath industry, the manifold may be constructed of a polymeric material, such as, e.g., plastic, and the plastic (e.g., polyvinyl chloride or acrylonitrile-butadiene-styrene) may in some preferred embodiments be ozone resistant and may have a specific gravity at or near that of water, e.g., approximately 1.01 specific gravity.

DESCRIPTION OF ADDITIONAL EMBODIMENTS OF THE INVENTION

In a third embodiment of the present invention, a manifold with a greater number of distribution outlet ports (5) may be desired. This embodiment may be achieved by combining two or more of the above described standard ten-port manifolds, in the following manner. E.g., to achieve a twenty-port manifold, one ten-port manifold (FIGS. 1 through 3) is cut open such that its closed terminal end is removed; the end of this manifold is now open, and this open terminal end is fitted, secured, and if desired, glued, into the circular intake opening (1) and the intake port (2) into a second ten-port manifold, thereby making an improvised twenty-port manifold, as shown in FIGS. 4 through 7. Variations of this procedure may be employed to create manifolds of many different sizes, which may be used in industry, and most particularly, the spa industry.

In a fourth embodiment of the present invention, a manifold with a smaller number of distribution outlet ports (5) may be desired. This embodiment may be achieved by plugging the distribution outlet ports (5) on, e.g., on the the above described standard ten-port manifolds (FIGS. 1 through 3). E.g., to achieve a six-port manifold, one simply selects four distribution outlet ports (5) on the standard ten-port manifold (FIGS. 1 through 3) to plug, thereby effectively creating a six-port manifold. Variations of this procedure may be employed to create manifolds of many different sizes, which may be used in industry, and most particularly, the spa industry.

In a fifth embodiment of the present invention, a manifold with, e.g., sixteen distribution outlet ports (6) may be desired. To achieve this sixteen-port manifold, one ten-port manifold (FIGS. 1 through 3) is cut open such that its closed terminal end (6) is removed; the end of this manifold is now open, and this open terminal end is fitted, secured, and if desired, glued into the circular intake opening (1) and the intake port (2) of a second ten-port manifold, thereby making an improvised twenty-port manifold. To achieve a sixteen-port manifold from this twenty-port manifold, one now plugs four undesired distribution outlet ports (5), thereby creating an improvised sixteen-port manifold.

Figure 4:
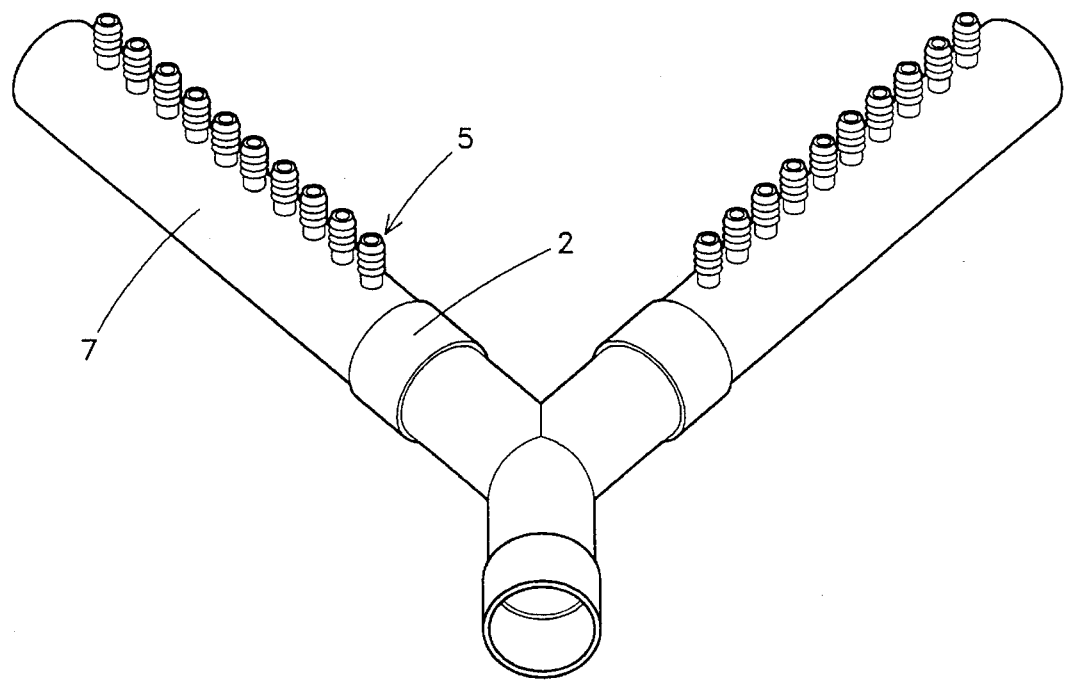
FIG. 4 shows an isometric front view of a manifold attached to each end of the bifurcated ends of a Y-joint.
Figure 5:
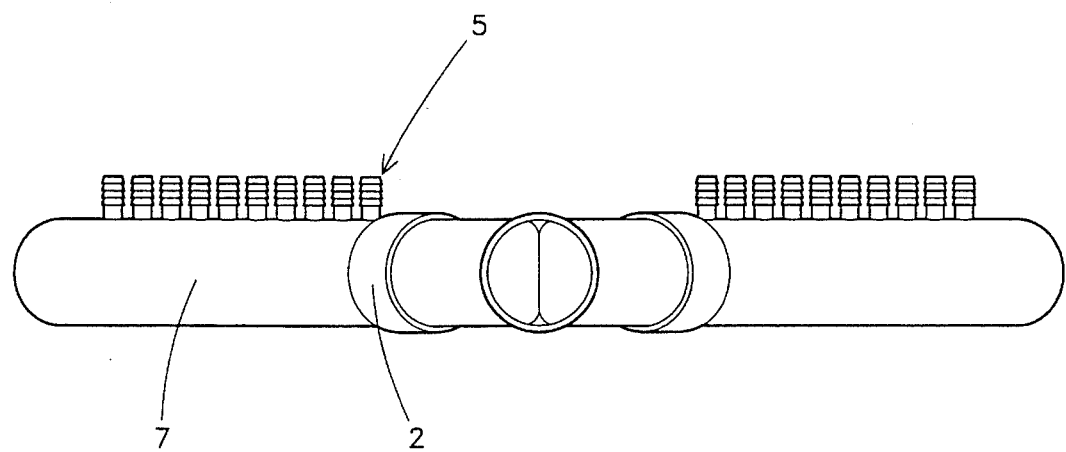
FIG. 5 shows a front view of a manifold attached to each end of the bifurcated ends of a Y-joint.

In a sixth embodiment of the present invention, a manifold with, e.g., twenty distribution outlet ports (5) may be desired. Another means of achieving this result is by fitting the intake piping or plumbing, which normally is fitted and glued into the manifold's intake port (2), into a T-joint pipe or a Y-joint pipe, and then to fit and glue each of the two manifolds (e.g., FIG. 1), each manifold (FIGS. 1 through 3) having ten distribution outlet ports (5), onto each two ends of the T-joint pipe or the Y-joint pipe, as shown in FIGS. 4 and 5. This configuration has the added advantage of affording the fluid exiting the distribution outlet ports (5) a more uniform fluid pressure, and consequently, a more uniform fluid pressure at the jet site, when used in spas and hydrotherapy baths. Manifold configurations with many distribution outlet ports (5) in one line, may experience a decline in fluid pressure as a function of how far down line the distribution outlet port (5) is located.

Figure 6:
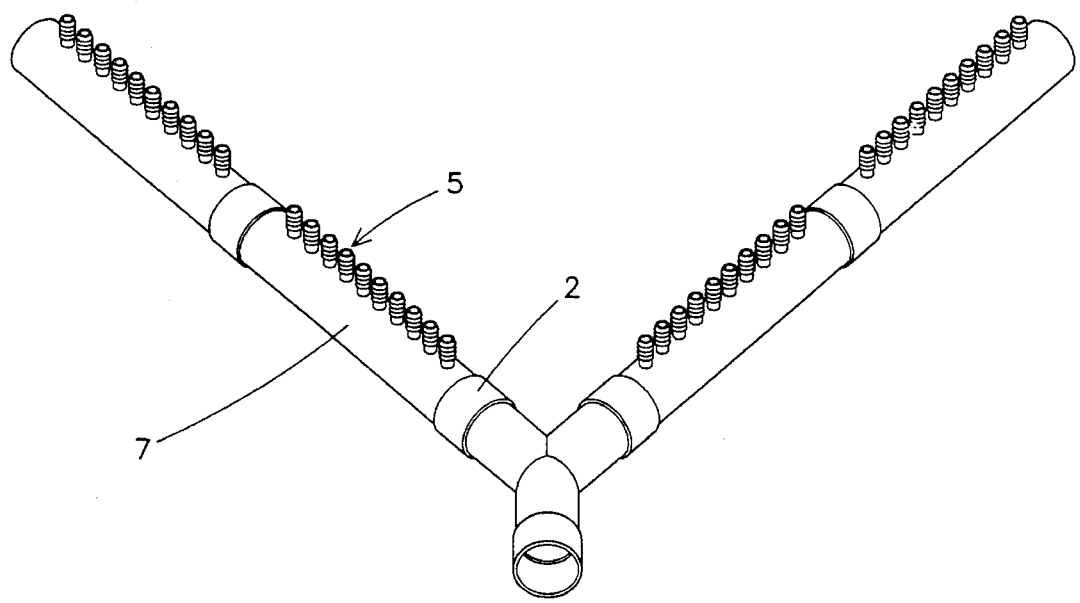
FIG. 6 shows an isometric front view of a pair of two manifolds joined together, and each pair is attached to each of the bifurcated ends of a Y-joint.
Figure 7:
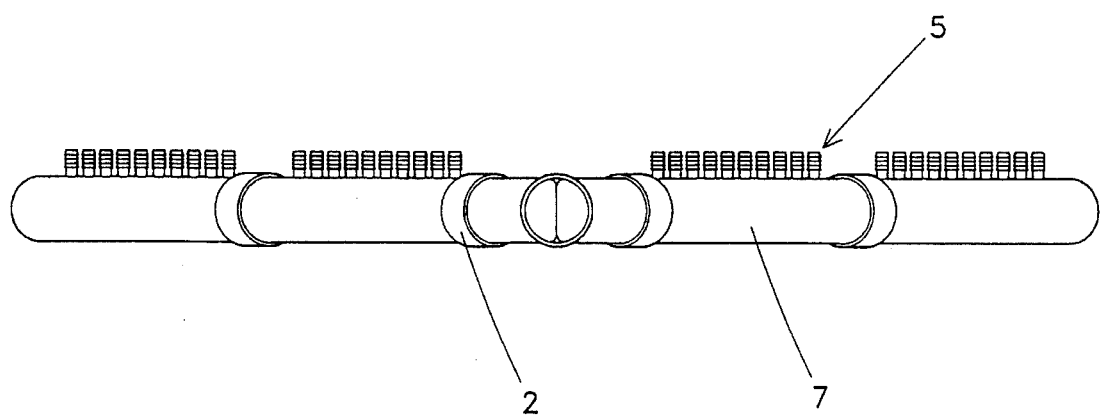
FIG. 7 shows a front view of a pair of two manifolds joined together, and each pair is attached to each of the bifurcated ends of a Y-joint.

In a seventh embodiment of the present invention, a thirty-six port manifold system may be desired. In this embodiment, four manifolds (e.g., FIG. 1), each manifold (FIGS. 1 through 3) having ten distribution outlet ports (5), are combined to form two independent pairs of improvised twenty-port manifolds, in the manner described below and each of the two improvised twenty-port manifolds are attached to each of the two outlets of a T-joint or a Y-joint pipe, as shown in FIGS. 6 and 7. To achieve a twenty-port manifold, one ten-port manifold (FIGS. 1 through 3) is cut open such that its closed terminal end (6) is removed; the end of this manifold is now open, and this open terminal end is fitted, secured, and if desired, glued, into the circular intake opening (1) and the intake port (2) of a second ten-port manifold, thereby making an improvised twenty-port manifold, as shown in FIGS. 6 and 7. Once two improvised twenty-port manifolds are constructed and fitted, secured, and glued onto the outlet ends of a T-joint or a Y-joint, two distribution outlet ports (5) are plugged in order to achieve the desired thirty-six port manifold system. Variations of this procedure may be used to achieve many varieties of manifolds, with varying numbers of distribution outlet ports. This manifold configuration has the added advantage of affording the fluid exiting the distribution outlet ports (5) a more uniform fluid pressure, and consequently, a more uniform fluid pressure at the jet site, when used in spas and hydrotherapy baths. Manifold configurations with many (e.g., 36) distribution outlet ports (5) in one line, may experience a decline in fluid pressure as a function of how far down line the distribution outlet port (5) is located.

In an eighth embodiment of the present invention, the inner surface of the manifold's intake port (2) is threaded so as to accommodate a matedly threaded intake piping or plumbing, which will form a sealed fit and may, if desired, avoid the glueing process, as shown in FIG. 12.

In a nineth embodiment of the present invention, the inner surface of the manifold's intake port (2) is threaded so as to accommodate a matedly threaded intake piping or plumbing, which will form a sealed fit and may, if desired, avoid the glueing process. In this embodiment, the outer surface of the end of the cylindrical path (7), between the distribution outlet port (5) farthest from the intake port (2), and the closed terminal end (6) of the manifold (e.g., FIG. 1), is threaded so that it may be matedly connected to the threaded intake port (2), and used as a larger manifold system, once the closed terminal end (6) is cut off or removed, as shown in FIG. 12. This embodiment is essentially two or more manifolds (e.g., FIG. 1) matedly threaded and thereby connected and with the intake flow piping, which is matedly threaded and thereby connected to the first manifold in-line, i.e., the first manifold with its closed terminal end (6) cut-off or removed. This embodiment may be used to avoid the glueing process and to configure larger manifold systems where more distribution outlet ports (5) are desired. This embodiment may also be used for manifolds matedly threaded to T-joint or Y-joint intake flow piping or plumbing, for configuring larger manifold systems with a more uniform fluid flow pressure and where glueing is not desired.

Figure 8:
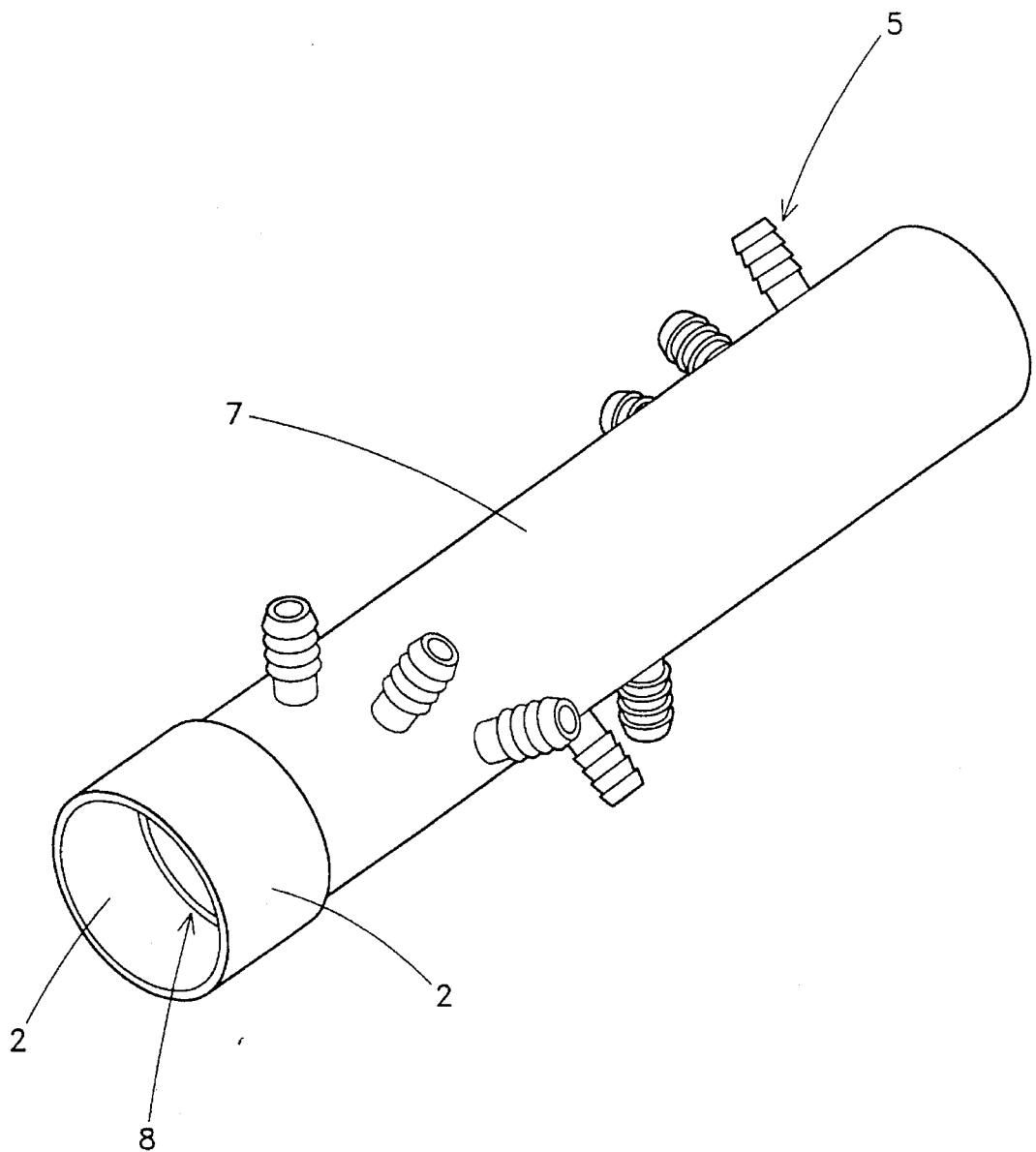
FIG. 8 shows an isometric front view of a manifold wherein the array or sequence of distribution output ports are arranged in a spiral around the cylindrical path of the manifold.
Figure 9:
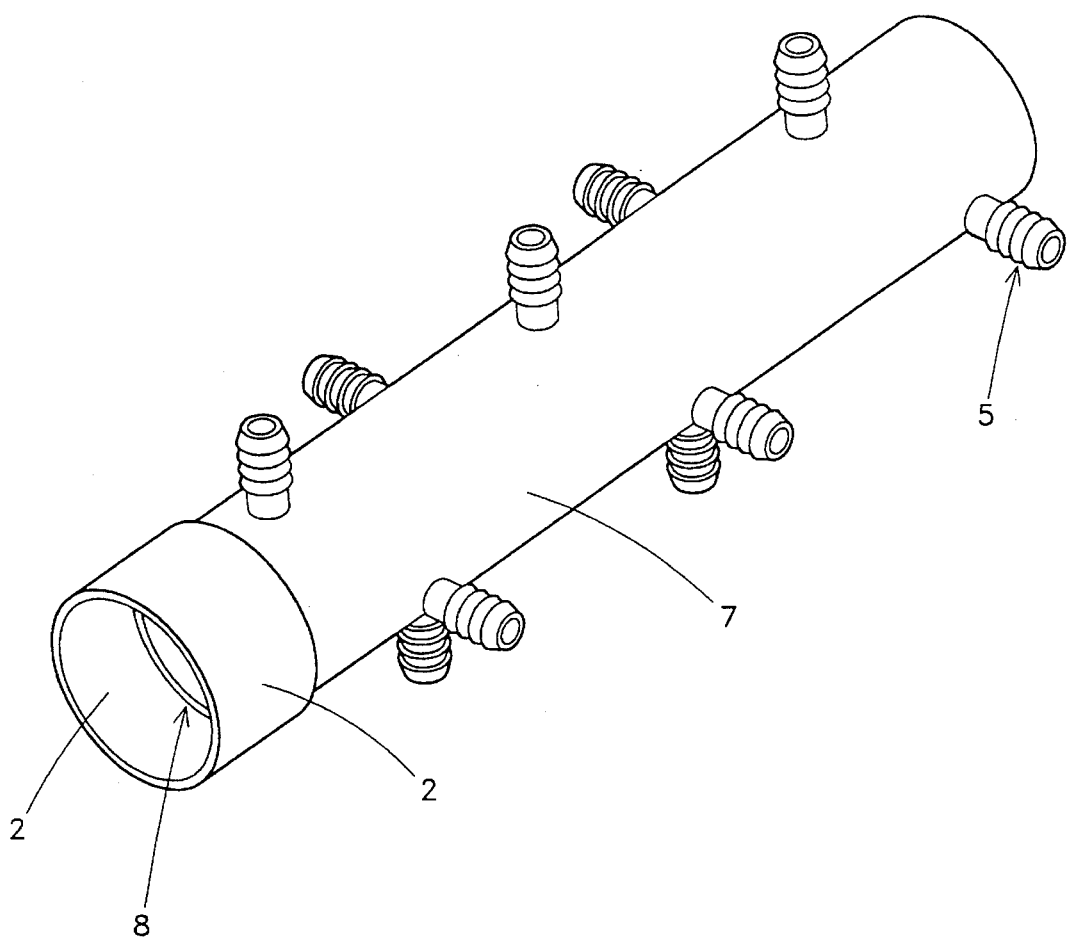
FIG. 9 shows an isometric front view of a manifold wherein the array or sequence of distribution output ports are arranged in a spiral around the cylindrical path of the manifold, and wherein the distribution outlet ports are spiraling about the cylindrical path in approximately 90-degree increments.

In a tenth embodiment of the present invention, the arrangement of output ports are in a spiral arrangement, as shown in FIG. 8, or wherein the spiraling output ports may be in, e.g., 90-degree increments around the cylindrical path of the manifold body, as shown in FIG. 9.

Figure 10:
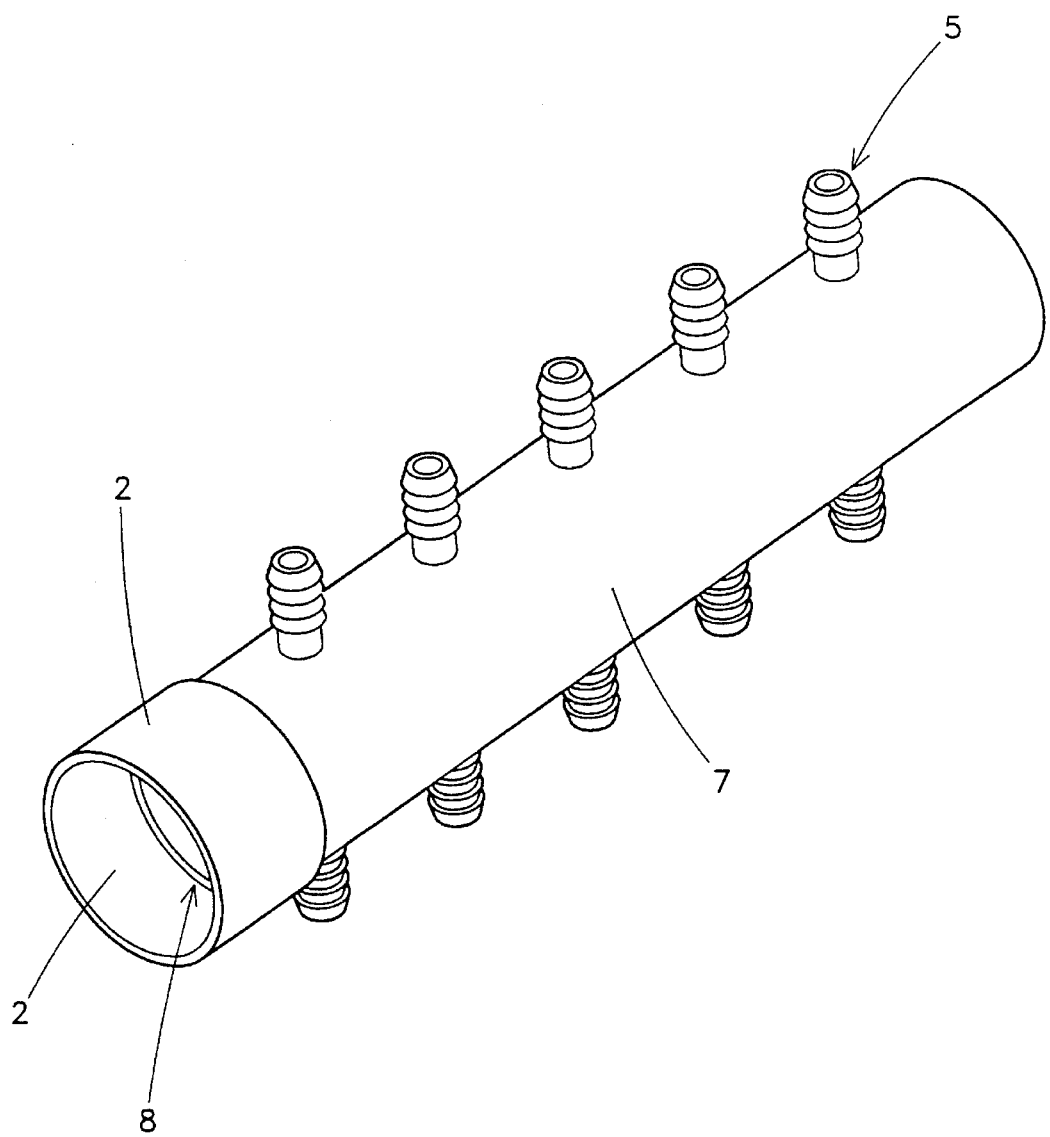
FIG. 10 shows an isometric front view of a manifold wherein the array or sequence of distribution output ports are arranged in an alternating arrangement of approximately 180-degree increments along the cylindrical path of the manifold.

In an eleventh embodiment of the present invention, the arrangement of output ports is in a 180-degree arrangement, wherein the output ports are arranged in an alternating arrangement of approximately 180-degree increments along the cylindrical path of the manifold body, as shown in FIG. 10.

In a twelveth embodiment of the present invention, the output ports are arranged in an approximately 180-degree arrangement, in increments along the cylindrical path of the manifold, wherein the first plurality of output ports are in-line and a second plurality of output ports are in-line and on the opposite side of the cylindrical path of the manifold, as shown in FIG. 11.

In a thirteenth embodiment of the present invention, the output ports are arranged in approximately parallel rows along one side of the cylindrical path of the manifold, as shown in FIG. 15.

In a fourteenth embodiment of the present invention, the output ports are arranged with three rows of output ports, each row being generally 90-degrees around the cylindrical path from its closest neighboring row of output ports, as shown in FIG. 14.

In a fifteenth embodiment of the present invention, the output ports are arranged with four rows of output ports, each row being generally 90-degrees around the cylindrical path from its neighboring row of output ports, as shown in FIG. 13.

In a sixteenth embodiment of the present invention, the output ports are arranged with two sets of generally parallel rows of output ports, and each set of parallel rows is generally 180-degrees opposite each other along the cylindrical path of the manifold body, as shown in FIG. 16.

In a seventeenth embodiment of the present invention, the output ports are arranged with three sets of generally parallel rows of output ports, along the cylindrical path the manifold body, as shown in FIG. 17.

In an eighteenth embodiment of the present invention, the output ports are arranged with four sets of generally parallel rows of output ports, and each set of parallel rows is generally 90-degrees around the cylindrical path of the manifold body, from its neighboring row of output ports, as shown in FIG. 18.

While I have shown and described in this disclosure only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, additions, and eliminations, as are encompassed by the scope of the appended claims.

I claim:

1. A distributor manifold, suitable for distributing fluids, including air, comprised of:

a. a circular intake opening, which forms an intake end of said manifold, b. a cylindrically shaped intake port, to receive and house a suitable portion of an end of intake piping or plumbing, which first traveled through said circular intake opening, c. a manifold path, where there are located in an array or sequence along a surface of said manifold path, between about three and fifteen distribution outlet openings, d. said three to fifteen distribution outlet openings located and arranged in an array or sequence along said manifold path, e. a cylindrical path, where there are located in an array or sequence along said cylindrical path, between about three and fifteen distribution outlet ports, emanating from said distribution outlet openings, f. the same number of distribution outlet ports as there are distribution outlet openings, and which are each associated with each of said distribution outlet openings, and said distribution outlet ports protrude from said cylindrical path of said manifold, g. a closed terminal end on said manifold, wherein said manifold path comes to an end, h. an interface ridge, located between said intake port and a narrower open end of said manifold path of said manifold, and said interface ridge has dimensions which are a function of the difference between the diameter of said intake port and the diameter of said manifold path of said manifold, i. barbs on the outer surface of said distribution outlet ports, to accommodate and secure flexible outlet tubing or plumbing, and j. wherein a portion of an end opposite the intake end, of said cylindrical path can be fit in through said circular intake opening and into said intake port of another of said manifold devices.

2. A distributor manifold, as recited in claim 1, wherein said portion of the end opposite said intake end, of said cylindrical path is threaded, and can be matedly fit in through the circular intake opening and into the matedly threaded intake port of another of said manifold devices.

3. A distributor manifold, as recited in claim 1, wherein said distributor manifold is matedly connected to another of said manifold devices, and wherein one of these two distributor manifold devices has had its closed terminal end removed in order to achieve a continuous fluid flow through both matedly connected manifold devices, the other manifold device having its closed terminal end in place.

4. A distributor manifold, as recited in claim 2, wherein said distributor manifold is matedly threaded and connected to another of said manifold devices, and wherein one of these two distributor manifold devices has had its closed terminal end removed in order to achieve a continuous fluid flow through said manifold path of both matedly threaded and connected manifold devices, the other manifold device having its closed terminal end in place.

5. A distributor manifold, as recited in claim 1, wherein said intake port of said distributor manifold is connected to one end of two output ends of a T-joint or a Y-joint, and another said distributor manifold is similarly connected to the other output end of said T-joint or Y-joint.

6. Two distributor manifolds connected together, as recited in claim 3, wherein said intake port of said two distributor manifolds connected together, is connected to one end of two output ends of a T-joint or a Y-joint, and another said two distributor manifolds connected together is similarly connected to the other output end of said T-joint or Y-joint.

7. A distributor manifold, as recited in claim 2, wherein said intake port of said distributor manifold is matedly threaded and connected to one end of two output ends of a T-joint or a Y-joint, and another said distributor manifold is similarly connected to the other output end of said T-joint or Y-joint.

8. Two distributor manifolds matedly threaded and connected together, as recited in claim 4, wherein said intake port of said two distributor manifolds matedly threaded and connected together, is matedly threaded and connected to one end of two output ends of a T-joint or a Y-joint, and another said two distributor manifolds matedly threaded and connected together is similarly matedly threaded and connected to the other output end of said T-joint or Y-joint.

9. In a spa or hydrotherapy bath, a modular arrangement of distribution manifolds, suitable for distributing fluids, including air, wherein each distributor manifold is comprised of:

circular intake opening, which forms an intake end of said manifold, b. a generally cylindrically shaped intake port, to receive and house a suitable portion of an end of intake piping or plumbing, which first traveled through said circular intake opening, c. a manifold path, where there are located in an array or sequence along said manifold path, a plurality of distribution outlet openings, d. said plurality of distribution outlet openings located and arranged in an array or sequence along said manifold path, e. a cylindrical path, where there are located in an array or sequence along said cylindrical path, a plurality of distribution outlet ports, emanating from said distribution outlet openings, f. the same number of distribution outlet ports as there are distribution outlet openings, and each distribution outlet opening is associated with and in communication with its respective distribution outlet port, and said distribution outlet ports protrude from said cylindrical path of said manifold, g. an interface ridge located between said intake port and a narrower open end of said manifold path of said manifold, and said interface ridge has dimensions which are a function of the difference between the diameter of said intake port and the diameter of said manifold path, and h. wherein said modular arrangement of distributor manifolds may be made modular by fitting into said circular intake opening of one distributor manifold, the open terminal end of another distributor manifold.

10. A modular arrangement of distributor manifolds, as recited in claim 9, wherein a final distributor manifold, in said modular arrangement of manifolds, has a closed terminal end, and wherein said manifold path comes to an end.

11. A distributor manifold, suitable for distributing fluids, including air, comprised of:

a. a circular intake opening, which forms an intake end of said manifold, b. a cylindrically shaped intake port, to receive and house a suitable portion of an end of intake piping or plumbing, which first traveled through said circular intake opening, c. a manifold path, where there are located in an array or sequence along a surface of said manifold path, between about three and twenty distribution outlet openings, d. said three to twenty distribution outlet openings located and arranged in an array or sequence along said manifold path, e. a cylindrical path, where there are located in an array or sequence along said cylindrical path, between about three and twenty distribution outlet ports, emanating from said distribution outlet openings, the same number of distribution outlet ports as there are distribution outlet openings, and which are each associated with each of said distribution outlet openings, and said distribution outlet ports protrude from said cylindrical path of said manifold, g. a closed terminal end on said manifold, wherein said manifold path comes to an end, h. an interface ridge, located between said intake port and a narrower open end of said manifold path of said manifold, and said interface ridge has dimensions which are a function of the difference between the diameter of said intake port and the diameter of said manifold path of said manifold, i. ribs on the outer surface of said distribution outlet ports, to accommodate and secure flexible outlet tubing or plumbing, and j. wherein a portion of an end opposite the intake end, of said cylindrical path can be fit in through said circular intake opening and into said intake port of another said manifold devices.

12. A distributor manifold, as recited in claim 11, wherein said portion of the end opposite said intake end, of said cylindrical path is threaded, and can be matedly fit in through the circular intake opening and into the matedly threaded intake port of another of said manifold devices.

13. A distributor manifold, as recited in claim 11, wherein said distributor manifold is matedly connected to another of said manifold devices, and wherein one of these two distributor manifold devices has had its closed terminal end removed in order to achieve a continuous fluid flow through both matedly connected manifold devices, the other manifold device having its closed terminal end in place.

14. A distributor manifold, as recited in claim 12, wherein said distributor manifold is matedly threaded and connected to another of said manifold devices, and wherein one of these two distributor manifold devices has had its closed terminal end removed in order to achieve a continuous fluid flow through said manifold path of both matedly threaded and connected manifold devices, the other manifold device having its closed terminal end in place.

15. A distributor manifold, as recited in claim 11, wherein said intake port of said distributor manifold is connected to one end of two output ends of a T-joint or a Y-joint, and another said distributor manifold is similarly connected to the other output end of said T-joint or Y-joint.

16. Two distributor manifolds connected together, as recited in claim 13, wherein said intake port of said two distributor manifolds connected together, is connected to one end of two output ends of a T-joint or a Y-joint, and another said two distributor manifolds connected together is similarly connected to the other output end of said T-joint or Y-joint.

17. A distributor manifold, as recited in claim 12, wherein said intake port of said distributor manifold is matedly threaded and connected to one end of two output ends of a T-joint or a Y-joint, and another said distributor manifold is similarly connected to the other output end of said T-joint or Y-joint.

18. Two distributor manifolds matedly threaded and connected together, as recited in claim 14, wherein said intake port of said two distributor manifolds matedly threaded and connected together, is matedly threaded and connected to one end of two output ends of a T-joint or a Y-joint, and another said two distributor manifolds matedly threaded and connected together is similarly matedly threaded and connected to the other output end of said T-joint or Y-joint.

19. In a spa or hydrotherapy bath, distribution manifold, suitable for distributing fluids, including air, wherein said distributor manifold is comprised of:
 a. a circular intake opening, which forms an intake end of said manifold,
 b. a generally cylindrically shaped intake port, to receive and house a suitable portion of an end of intake piping or plumbing, which first traveled through said circular intake opening,
 c. a manifold path, where there are located in an array or sequence along said manifold path, a plurality of distribution outlet openings,
 d. said plurality of distribution outlet openings located and arranged in an array or sequence along said manifold path,
 e. a cylindrical path, where there are located in an array or sequence along said cylindrical path, a plurality of distribution outlet ports, emanating from said distribution outlet openings,
 the same number of distribution outlet ports as there are distribution outlet openings, and each distribution outlet opening is associated with and in communication with its respective distribution outlet port, and said distribution outlet ports protrude from said cylindrical path of said manifold,
 g. an interface ridge located between said intake port and a narrower open end of said manifold path of said manifold, and said interface ridge has dimensions which are a function of the difference between the diameter of said intake port and the diameter of said manifold path, and
 h. wherein said distributor manifold may be made modular by fitting into said circular intake opening of one distributor manifold, the open terminal end of another distributor manifold.

20. A modular arrangement of distributor manifolds, as recited in claim 19, wherein a final distributor manifold, in said modular arrangement of manifolds, has a closed terminal end, and wherein said manifold path comes to an end.

21. A distributor manifold, suitable for distributing air in a spa and hydrotherapy systems, comprised of:
 a. a circular intake opening, which forms an intake end of said manifold,
 b. a cylindrically shaped intake port, which receives and houses a sufficient length of an end of intake piping or plumbing, which first traveled through said circular intake opening,
 c. a manifold path, where there are located in a straight line along a surface of said manifold path, approximately ten distribution outlet openings,
 d. a plurality of distribution outlet openings located and arranged in a straight line arrangement, along the inner surface of said manifold path,
 e. a cylindrical path, where there are located in an array or sequence along said cylindrical path, a plurality of distribution outlet ports, emanating from their respective distribution outlet openings,
 f. a plurality of distribution outlet ports, which are ribbed or barbed, or both ribbed and barbed, on their outer surface in order to accommodate and secure flexible tubing, piping, or plumbing, protruding from said cylindrical path of said manifold, such that each said distribution outlet port is associated with its one associated distribution outlet opening,
 g. a closed terminal end of said manifold, wherein said manifold path and said cylindrical path, along said manifold path come to an end,
 h. an interface ridge, located between said intake port and the open end of said manifold path of said manifold, and said interface ridge has a surface area which is a function of the difference between the diameter of said intake port and said manifold path of said manifold,
 i. physical dimensions such that a sufficient length from the end of the cylindrical path, opposite the intake end, of said distributor manifold is without distribution outlet ports, and that said sufficient length of the end of said cylindrical path has a diameter, which will allow said end of said cylindrical path to be fit in through the circular intake opening and into the intake port of another similar distributor manifold device, and thereby be used as a double-sized distributor manifold with additional distribution outlet ports, with the closed terminal end removed from the manifold which is fit within said similar manifold, and
 j. a material composition selected from the polymeric materials, such as plastic.

22. A distributor manifold, as recited in claim 21, wherein said polymeric material is comprised of polyvinyl chloride.

23. A distributor manifold, as recited in claim 21, wherein said polymeric material is comprised of acrylonitrile-butadiene-styrene.

* * * * *